United States Patent
Forkins, Sr.

(10) Patent No.: US 9,834,662 B2
(45) Date of Patent: Dec. 5, 2017

(54) COMPOSITE MATERIAL

(71) Applicant: FiberSpec LLC, Two Rivers, WI (US)

(72) Inventor: David Forkins, Sr., Manitowoc, WI (US)

(73) Assignee: FiberSpec LLC, Two Rivers, WI (US)

( * ) Notice: Subject to any disclaimer, the term of this patent is extended or adjusted under 35 U.S.C. 154(b) by 0 days.

(21) Appl. No.: 15/408,221

(22) Filed: Jan. 17, 2017

(65) Prior Publication Data

US 2017/0204254 A1    Jul. 20, 2017

Related U.S. Application Data

(60) Provisional application No. 62/280,050, filed on Jan. 18, 2016.

(51) Int. Cl.
*C08K 7/00* (2006.01)
*C08K 7/20* (2006.01)
*C08K 7/14* (2006.01)

(52) U.S. Cl.
CPC ............ *C08K 7/20* (2013.01); *C08K 7/14* (2013.01); *C08K 2201/003* (2013.01)

(58) Field of Classification Search
CPC ....... C08K 7/20; C08K 7/14; C08K 2201/003
See application file for complete search history.

(56) References Cited

U.S. PATENT DOCUMENTS

| | | | | |
|---|---|---|---|---|
| 4,327,536 A | * | 5/1982 | Ascher | E04C 2/384 52/309.12 |
| 4,450,873 A | * | 5/1984 | Sadler | B29C 53/583 138/125 |
| 4,623,584 A | * | 11/1986 | Masui | B32B 5/18 264/257 |
| 4,983,442 A | * | 1/1991 | Patel | B32B 3/26 156/293 |
| 2015/0025180 A1 | * | 1/2015 | Monden | C08J 3/22 524/116 |
| 2015/0140306 A1 | * | 5/2015 | Endo | D04H 1/4218 428/219 |

OTHER PUBLICATIONS

Poraver Brochure, Mineral Casting and Polymer Concrete, pp. 1-3 Polyurethane, pp. 1-2 dated Jun. 2013 and Advantages of Vanity Tops, pp. 1-2, dated Feb. 2014.
Metapor Brochure, Technical Information, pp. 1-2, dated Feb. 2014 and Material Safety Data Sheet, pp. 1-3, dated Jul. 11, 2014.
Poraver Brochure, PUR Bounds Boards and Profiles, pp. 1-2, dated Jun. 2013, PUR bonded panels and profiles with Porvaver, p. 1, and PUR boards with Poraver expanded glass, p. 1, dated Dec. 2012.

* cited by examiner

*Primary Examiner* — Hannah Pak
(74) *Attorney, Agent, or Firm* — Reinhart Boerner Van Deuren s.c.

(57) ABSTRACT

A composite material is provided. The composite material includes a plurality of beads in which each bead has a diameter. The composite material also including a plurality of fibers in which each fiber has a length and a width. The composite material further includes a resin binder. In the composite material, the length of each fiber is greater than the width of each fiber, and the width of each fiber is less than the diameter of each bead.

18 Claims, 2 Drawing Sheets

COMPOSITE MATERIAL

CROSS REFERENCE TO RELATED APPLICATION

The present application claims the benefit of and priority to U.S. Provisional Patent Application No. 62/280,050, filed Jan. 18, 2016, which is incorporated herein by reference in its entirety.

BACKGROUND

The disclosure relates generally to a composite material and more particularly to a composite material having a resin binder.

SUMMARY

According to one aspect, a composite material is provided. The composite material includes a plurality of beads, and each bead has a diameter. The composite material also includes a plurality of fibers, and each fiber has a length and a width. The composite material additionally includes a resin binder. In the composite material, the length of each fiber is greater than the width of each fiber, and the width of each fiber is less than the diameter of each bead.

In another aspect, a composite mixture is provided. The composite mixture includes between 10% and 15% by weight of first glass beads. Each of the first glass beads has a first diameter between 1.0 and 1.5 mm. The composite mixture also includes between 10% and 15% by weight of second glass beads. Each of the second glass beads has a second diameter between 0.05 and 1.0 mm. Further, the composite mixture includes between 15% and 20% by weight of fibers. Each fiber having a length between 0.05 and 13 mm. Additionally, the balance of the composite mixture includes a polyester resin having a viscosity between 450 and 550 centipoise.

In exemplary embodiments, the composite material includes a resin binder, beads of a first size, beads of a second size smaller than the first size, and a fiber.

In exemplary embodiments, the resin is a thermoset resin, such as a polyester resin. The beads are expanded glass beads, and the fiber material is glass fiber material.

In exemplary embodiments, the composite material may be used as a core material and/or a polymer casting material.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

While the invention will be described in connection with certain embodiments, there is no intent to limit it to those embodiments. On the contrary, the intent is to cover all alternatives, modifications and equivalents as included within the spirit and scope of the invention as defined by the appended claims.

DETAILED DESCRIPTION

Generally, in this disclosure, various embodiments of a composite material are provided. The composite material includes a first size of beads (hereinafter, "first beads"), a second size of beads (hereinafter, "second beads") that are smaller than the first beads, fiber (e.g., milled fibers, chopped fibers, etc.), and a resin binder. In a particular embodiment, the first and second beads are recycled glass beads and specifically are lightweight blown or expanded glass beads. In another embodiment, the resin binder is a thermosetting material, such as polyester resin. The composite material discussed herein is suitable for structural applications, and the components of the composite material can be tailored to have specific properties for specific applications, such as flame retardant capabilities, thermal insulation capabilities, high or low density, high or low acoustic transmission, and high temperature resistance. Additionally, the composite material is made of relatively inexpensive components, and this property enhances the composite material's suitability as a filler material, support material, or core material. While certain embodiments will be discussed herein by way of example, those skilled in the art will recognize from the following description that such embodiments are provided by way of example only, not by way of limitation, and that all alternative embodiments and applications are reserved herein.

Figure 1:
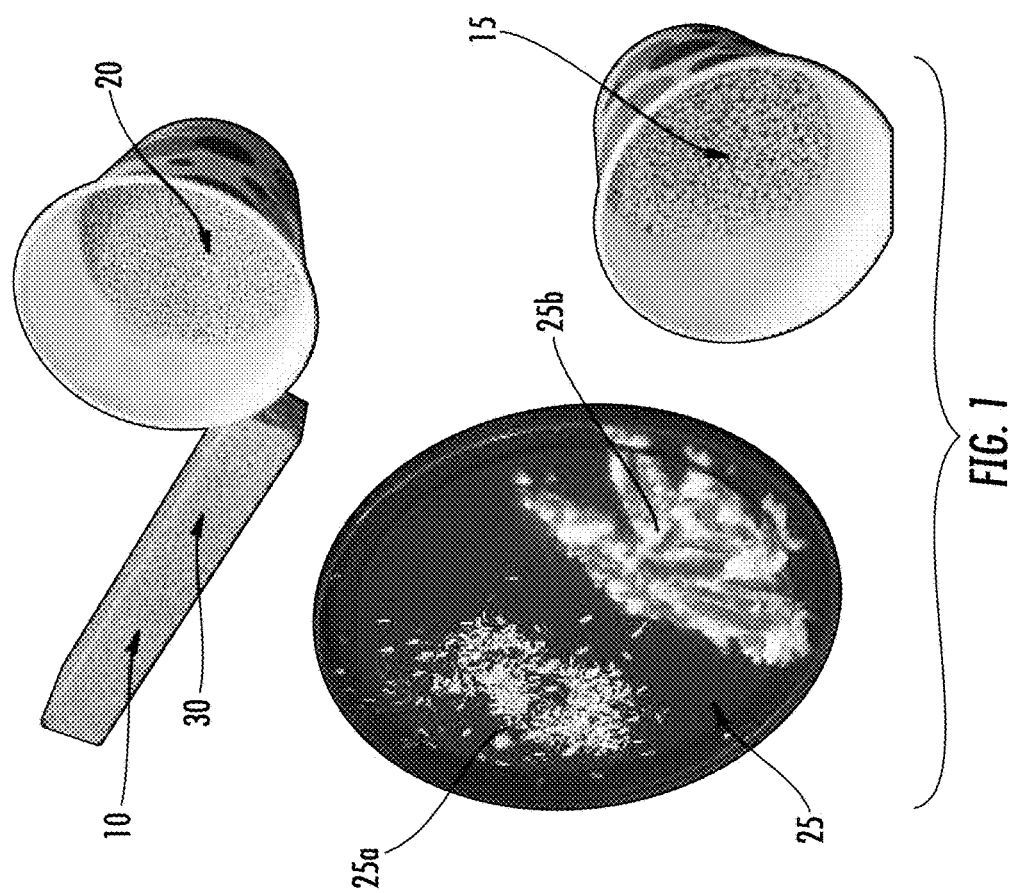
FIG. 1 is a picture of a composite material and components of the composite material according to an exemplary embodiment.
Figure 2:
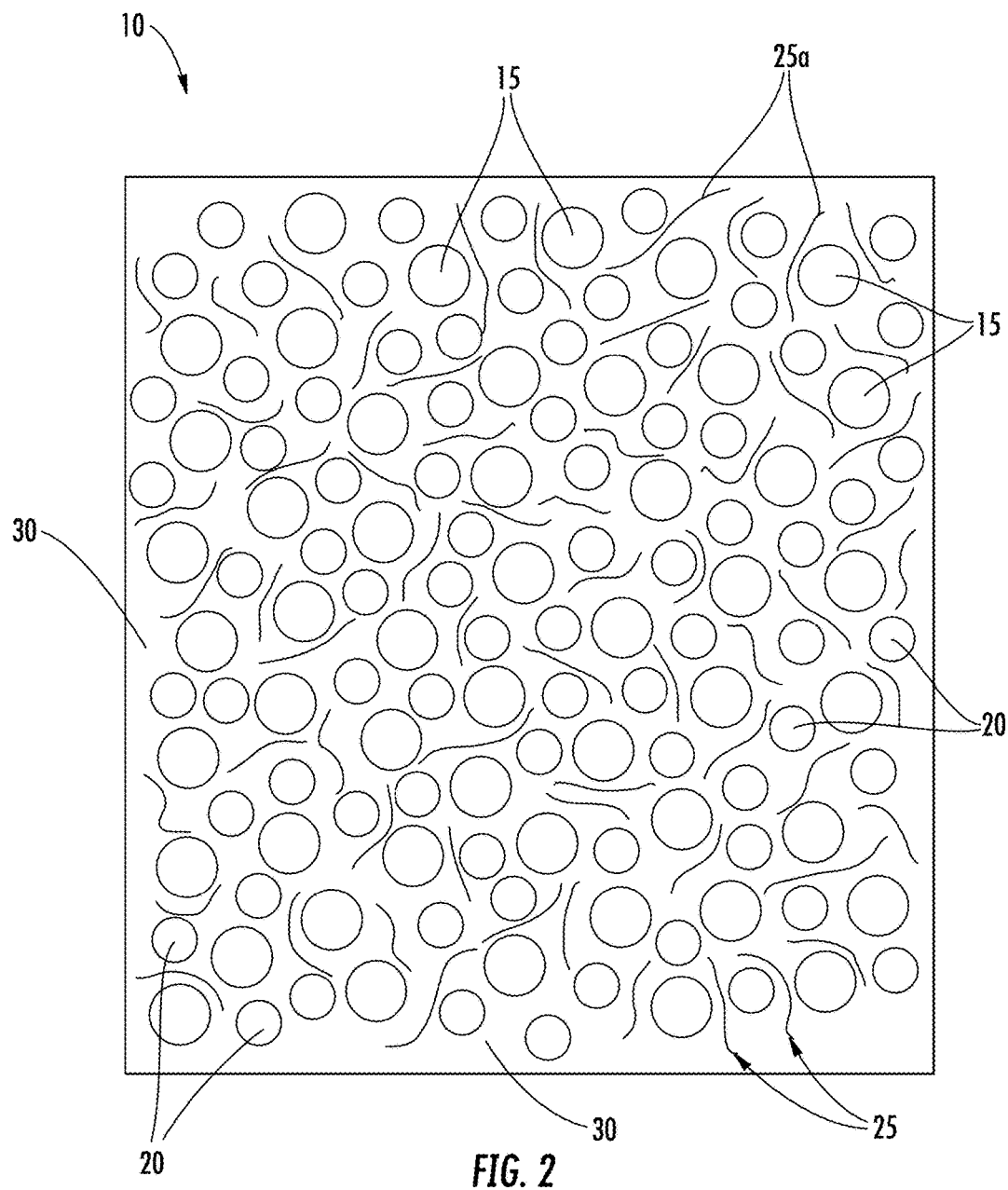
FIG. 2 is a cross-sectional view of a composite material according to an exemplary embodiment.

FIG. 1 depicts a photograph of a composite material 10. As can be seen in FIG. 1, the composite material 10 has been shaped into a solid, rectangular bar, demonstrating the ability of the composite material 10 to be formed, such as through casting or molding. The composite material 10 includes first beads 15, second beads 20, fibers 25, and a resin binder 30, which is specifically a polyester binder in the embodiment depicted. A representative cross section of a composite material 10 is illustrated in FIG. 2. As can be seen in FIG. 2, the first beads 15, second beads 20, and fibers 25 are evenly and randomly embedded throughout the resin binder 30.

As shown in FIG. 1, the first beads 15 are larger in size than the second beads 20. As used herein, the term "diameter" means the longest measurement of bead size and does not necessarily imply that the beads are spherical or substantially spherical; though, they are in certain embodiments. In an embodiment, the first beads 15 have a diameter of between 0.5 mm and 2.0 mm. In a specific embodiment, the first beads 15 have a diameter of between 1.0 mm and 1.5 mm. In an embodiment, the second beads 20 have a diameter that is between 0.01 mm and 1.5 mm. In a specific embodiment, the second beads 20 have a diameter that is between 0.05 mm and 1.0 mm. However, in another embodiment, the composite material may only have one size of beads, e.g., only first beads 15 or only second beads 20.

The first beads 15 and second beads 20 can be made of the same or different material as each other. In one embodiment, the first beads 15 and second beads 20 are made of the same material. In a specific embodiment, the first beads 15 and second beads 20 are both made of glass. In a more specific embodiment, the first beads 15 and second beads 20 are both made of recycled glass, i.e., glass that has been disposed of or discarded after undergoing its primary use. Additionally, in an embodiment, the first beads 15 and second beads 20 can be expanded glass. In one embodiment, the expanded glass is formed from finely milled soda-lime-borosilicate glass that is mixed with a blowing agent. Activation of the blowing agent during a high-temperature heat transfer process, which forms the finely milled glass into spheres, causes gas bubbles to form in the glass spheres. In another embodiment, the expanded glass is formed from subjecting perlite to an acid-leaching treatment.

In other embodiments, additional materials can be used as the first beads 15 and/or second beads 20. For instance, solid glass beads, expanded plastic beads, cenospheres, phenolic microspheres, carbonized phenolic microspheres, and combinations thereof are used in various embodiments of the composite material 10.

In an embodiment, the first beads 15 make up between 5 wt % and 20 wt % of the composite material 10. In certain embodiments, the first beads 15 make up between 10 wt % and 15 wt % of the composite material 10. In a specific embodiment, the first beads 15 make up 12 wt % of the composite material.

In an embodiment, the second beads 20 make up between 5 wt % and 25 wt % of the composite material 10. In certain embodiments, the second beads 20 make up between 10 wt % and 15 wt % of the composite material 10. In a specific embodiment, the second beads 20 make up 14 wt % of the composite material. In various embodiments, composite material 10 includes a greater percentage of second beads 20 than of first beads 15, where the total percentage of first beads 15 and second beads 20 is between 5 wt % and 50 wt % of the composite material, specifically is between 10 wt % and 40 wt % of the composite material, more specifically is between 20 wt % and 30 wt % of the composite material, and even more specifically is between 25 wt % and 30 wt % of the composite material In certain embodiments, first beads 15 and second beads 20 having different sizes are used to increase the packing density of the composite material 10. Using first beads 15 and second beads 20 of different sizes allows for the second beads 20, having the smaller size, to fill in the spaces between the larger first beads 15 as depicted in FIG. 2. Nevertheless, depending on the application, the first beads 15 and second beads 20 can be the same size.

FIG. 1 shows two types of fibers 25, namely milled and chopped fibers. The chopped fibers 25a have a length of approximately 5 mm. The milled fibers 25b are a powder-like shorter fiber, e.g., having a length less than 1 mm, less than 0.5 mm, less than 0.2 mm, less than 0.1 mm, less than 0.01 mm, etc. However, fibers 25, whether the chopped fibers 25a or milled fibers 25b, have a longer length than width. In certain embodiments, the fibers 25 have a length between 0.01 mm to 13 mm (0.5 in). FIG. 2 depicts an embodiment using the longer chopped fibers 25a.

In an embodiment, the fibers 25 are made of glass, including recycled glass. In another embodiment, the fibers 25 are made of another synthetic or natural fiber material. In certain embodiments, fibers, 25 such as graphite fibers, para-aramid fibers, and/or meta-aramid fibers, are used instead of or in addition to glass fibers.

In certain embodiments, the fibers 25 are added to increase the strength of the composite material 10. In a specific embodiment, such as the embodiment depicted in FIG. 2, the fibers 25 have random orientation within the composite material 10 in order to provide a modest increase in the elastic modulus and/or tensile strength of the composite material in all loading directions. In another specific embodiment, the fibers 25 are oriented along a specific direction in order to provide a more substantial increase in the elastic modulus and/or tensile strength of the composite material when loaded in the direction of fiber orientation.

In an embodiment, the fibers 25 make up between 10 wt % and 25 wt % of the composite material 10. In certain embodiments, the fibers 25 make up between 15 wt % and 25 wt % of the composite material 10. In a specific embodiment, the fibers 25 make up 17 wt % of the composite material 10.

As illustrated in FIG. 2, the resin binder 30 serves as a matrix for the first beads 15, second beads 20, and fibers 25. In an embodiment, the resin binder 30 is a thermosetting material and specifically a thermoset polymer material. In a specific embodiment, the resin binder 30 is a polyester resin, including isophthalic, orthophthalic, and dicyclopentadiene (DCPD) polyester resins. Additionally, in a specific embodiment, the resin binder has a viscosity of between 450 centipoise and 550 centipoise. In other embodiments, different resins can be used, including FDA approved resins, high temperature resins, standard resins, and no-VOC resins. Some commercial polyester resins suitable for use in certain disclosed embodiments include CORVE8301 (CoREZYN® by Interplastic Corporation of Minneapolis, Minn.), NOVOC® 8124 (Andara LLC of Sheboygan, Wis.), and SIL93BE-975ECO (Silmar® by Interplastic Corporation of Minneapolis, Minn.).

In an embodiment, the resin binder 30 makes up between 20 wt % and 80 wt %, and more specifically 40 wt % and 65 wt % of the composite material 10. In certain embodiments, resin binder 30 makes up between 50 wt % and 60 wt % of the composite material 10. In a specific embodiment, the resin binder 30 makes up 57 wt % of the composite material 10.

The components of the composite material 10 are mixed together to form a viscous paste or plaster, which can be cast or molded into a specific shape. A catalyst is used to cure the resin so as to permanently set the shape of the composite material. A variety of catalysts are suitable for use to cure the composite material, including methyl ethyl ketone peroxide (MEKP), benzyl peroxide, UV- and light-activated catalysts, and heat-activated catalysts. In embodiments, the catalyst is used in the amount of between 1 wt % and 3.5 wt % of the resin binder weight. The amount of catalyst used can depend on the mold temperature and the ambient temperature where the casting or molding takes place. In embodiments, more catalyst is used at relatively low mold and/or ambient temperatures than at relatively high mold and/or ambient temperatures. In a particular embodiment, the catalyst is MEKP in the amount of 1.25 wt % of the resin binder weight.

In embodiments using polyester resin, the final dimensions of the cast or molded product can be affected by the styrene content of the resin. Specifically, polyester resins containing a relatively high styrene content will experience more shrinkage than polyester resins containing a relatively low styrene content. In embodiments, the styrene content of the polyester resin is 55 wt % or less. In other embodiments, the styrene content of the polyester resin is less than 40 wt %, and in still other embodiments, the styrene content of the polyester resin is less than 20 wt %.

The composite material 10 can be used to form a variety of structures. Additionally, the composite material 10 can be used as a core material or filler material. In various embodiments, the composite material 10 is used as a structural or core material in a variety of items including automotive or vehicle structures or bodies, doors, door panels, furniture, patio furniture, cabinetry, countertops, flooring, window frames, bathroom fixtures, siding, roofing, etc.

The composite material discussed herein provides several additional advantageous properties. For instance, the composite material has good insulating properties and can be tailored to achieve a certain R-value. Further, the composite material can be made with fire retardant resins. The composite material also has good heat resistance, which helps to handle the heat generated during the exothermic curing reaction. Additionally, the composite material can be made in pre-batched containers for sale as mixable epoxy compounds. For example, the composite material can be sold as a patching compound kit consisting of an A-side, containing the resin binder, first and second beads, and fibers, and a B-side catalyst. The kit can be used for, e.g., fairing and patching concrete, among other types of materials.

Moreover, the composite material can be prepared in an environmentally friendly way. For instance, the first and second beads and fiber can be made from recycled products, such as the waste products of manufacturing. Additionally, the resin binder can be salvaged from resin companies after the companies clean their processing lines. During such a procedure, an odd lot of resin consisting of different esters becomes blended. This blended resin can be purchased and used as the resin binder in the present composite material. Further, using low styrene polyester resins limits VOC emissions during curing.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A composite material, comprising:
   a plurality of beads, each bead having a diameter;
   a plurality of fibers, each fiber having a length and a width; and
   a resin binder;
   wherein, the length of each fiber is greater than the width of each fiber;
   wherein the width of each fiber is less than the diameter of each bead;
   wherein the plurality of beads includes first beads having a first diameter and second beads having a second diameter, the second diameter being less than the first diameter; and
   wherein the second beads comprise between 5 wt % and 25 wt % of the composite material.

2. The composite material of claim 1, wherein the plurality of beads comprises between 5 wt % and 45 wt % of the composite material.

3. The composite material of claim 1, wherein the plurality of beads are selected from the group consisting of expanded glass beads, solid glass beads, expanded plastic beads, cenospheres, phenolic microspheres, carbonized phenolic microspheres, and combinations thereof.

4. The composite material of claim 1, wherein the diameter of each bead of the plurality of beads is between 0.01 mm and 2.0 mm.

5. The composite material of claim 1, wherein the first beads comprise between 5 wt % and 20 wt % of the composite material.

6. The composite material of claim 1, wherein the first diameter of each first bead is between 0.5 mm and 2.0 mm.

7. The composite material of claim 1, wherein the second diameter of each second bead is between 0.01 mm and 1.5 mm.

8. The composite material of claim 1, wherein the plurality of fibers comprises between 10 wt % and 25 wt % of the composite material.

9. The composite material of claim 1, wherein the length of each fiber of the plurality of fibers is between 0.01 mm and 13 mm.

10. The composite material of claim 1, wherein each fiber of the plurality of fibers is comprised of glass.

11. The composite material of claim 1, wherein the plurality of fibers is randomly oriented within the composite material.

12. The composite material of claim 1, wherein the resin binder is a polyester resin.

13. The composite material of claim 12, wherein the polyester resin has a styrene content of 55 wt % or less.

14. The composite material of claim 1, wherein the resin binder comprises between 20 wt % and 80 wt % of the composite material.

15. The composite material of claim 1, wherein the resin binder has a viscosity of between 450 and 550 centipoise.

16. The composite material of claim 1, wherein the composite material further comprises a catalyst selected from the group consisting of methyl ethyl ketone peroxide (MEKP), benzyl peroxide, UV-activated catalysts, light-activated catalysts, and heat-activated catalysts.

17. The composite material of claim 16, wherein the catalyst is added in an amount of between 1 wt % and 3.5 wt % of the resin binder.

18. A composite mixture, comprising:
   between 10% and 15% by weight of first glass beads, each of the first glass beads having a first diameter between 1.0 and 1.5 mm;
   between 10% and 15% by weight of second glass beads, each of the second glass beads having a second diameter between 0.05 and 1.0 mm;
   between 15% and 20% by weight of fibers, each fiber having a length between 0.05 and 13 mm; and
   the balance of a polyester resin having a viscosity between 450 and 550 centipoise.

* * * * *